United States Patent Office 3,424,357
Patented Jan. 28, 1969

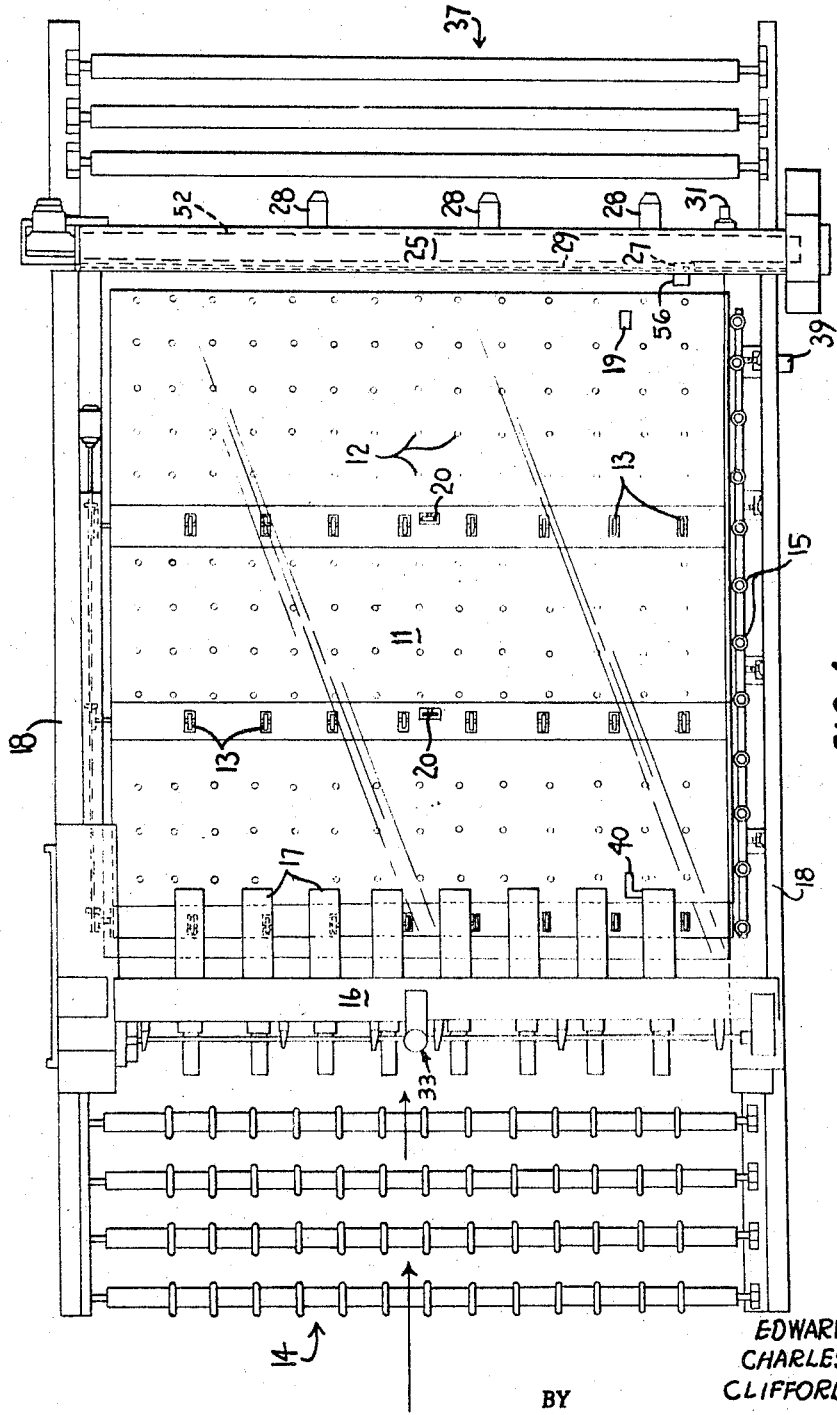

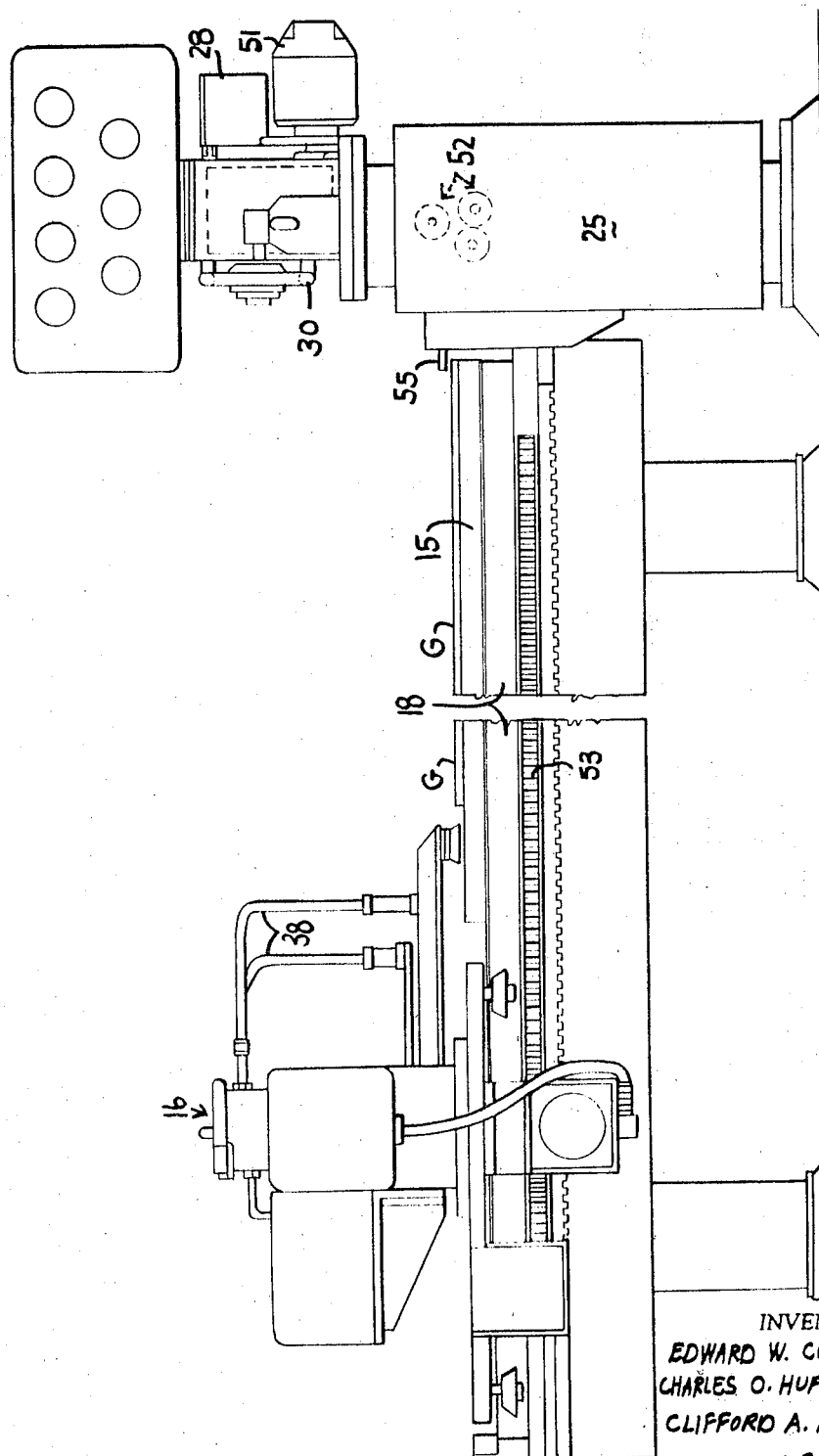

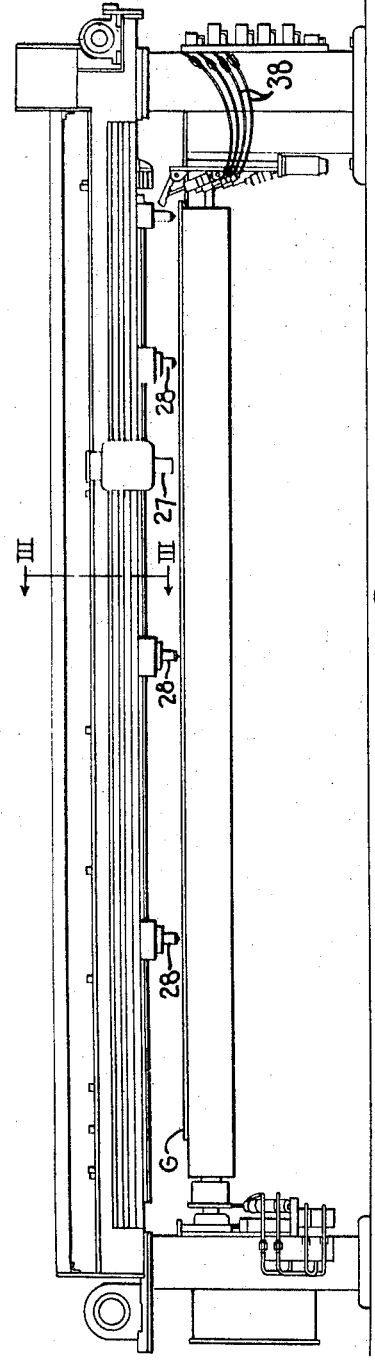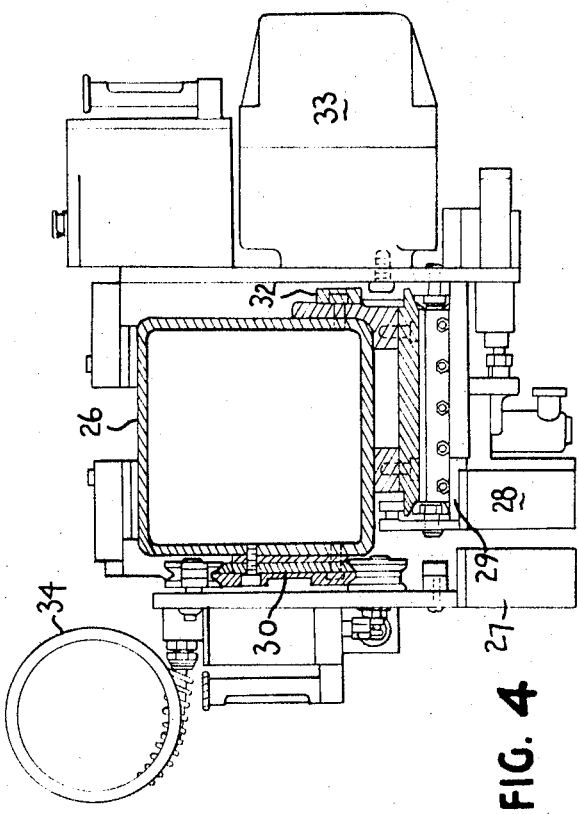

3,424,357
AUTOMATICALLY SIZING AND SEVERING
GLASS SHEETS
Edward W. Curtze, Charles O. Huffman, and Clifford A.
Mikus, Pittsburgh, Pa., assignors to PPG Industries Inc.,
Pittsburgh, Pa., a corporation of Pennsylvania
Filed July 28, 1966, Ser. No. 568,664
U.S. Cl. 225—2                                   7 Claims
Int. Cl. B26f 3/02; B65h 35/10; B26d 3/08

ABSTRACT OF THE DISCLOSURE

This invention is an apparatus and a method for severing glass sheets of preselected sizes from other larger sheets or a continuous ribbon of glass. The apparatus has an air table for supporting glass, a movable positioning bridge for transporting the glass, a second fixed bridge transversing the conveyor line, and scoring devices positioned thereon which are movable across the glass sheet. The positioning bridge and the movable scoring device are moved by servomechanisms. An input logic circuit and a control circuit under the command of an operator directs the sequence of operation. The method herein comprises floating sheets of glass over an air support, moving said sheet beneath a fixed bridge and scoring said sheet transversely and longitudinally to produce sized sheets and severing the sheet along the score lines.

---

This invention relates to a severing apparatus and a method of severing sheets of glass to form smaller sized sheets. Heretofore, glass has been cut manually into desired smaller sheets from large sheets. This cutting, or more correctly severing, operation involves several steps, including manual repositioning of the glass sheets and hand scoring the glass. The present invention provides an apparatus and a method of severing sheets into smaller sizes within an accuracy of ±.015″ of the desired dimensions and without manual repositioning of the sheet.

The invention permits a glass sheet to be transported upon an air table, squared relative to an index line, and scored both transversely and longitudinally of the direction of glass travel, and severed to form smaller sized sheets.

Figure 5:
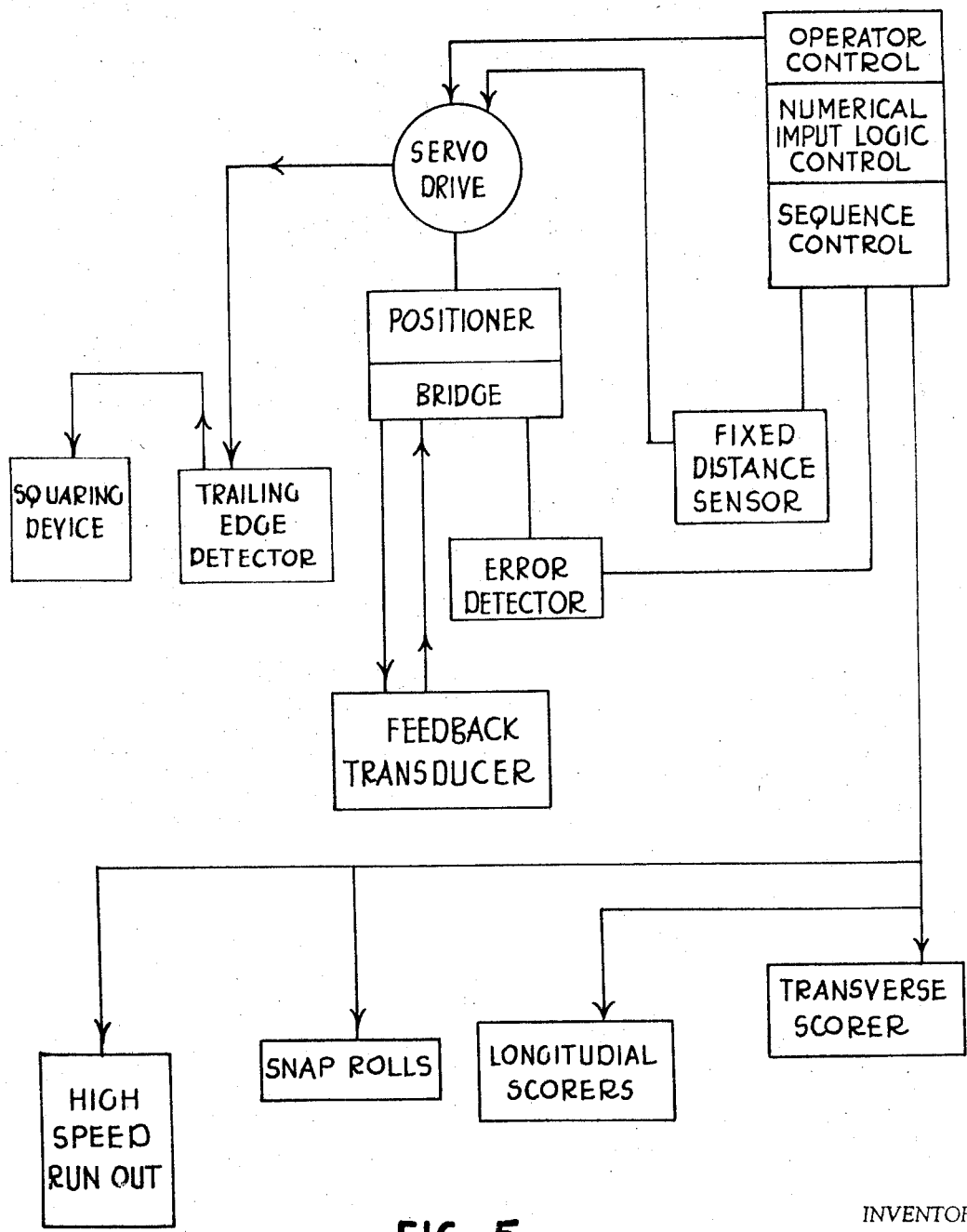
Figure 6:
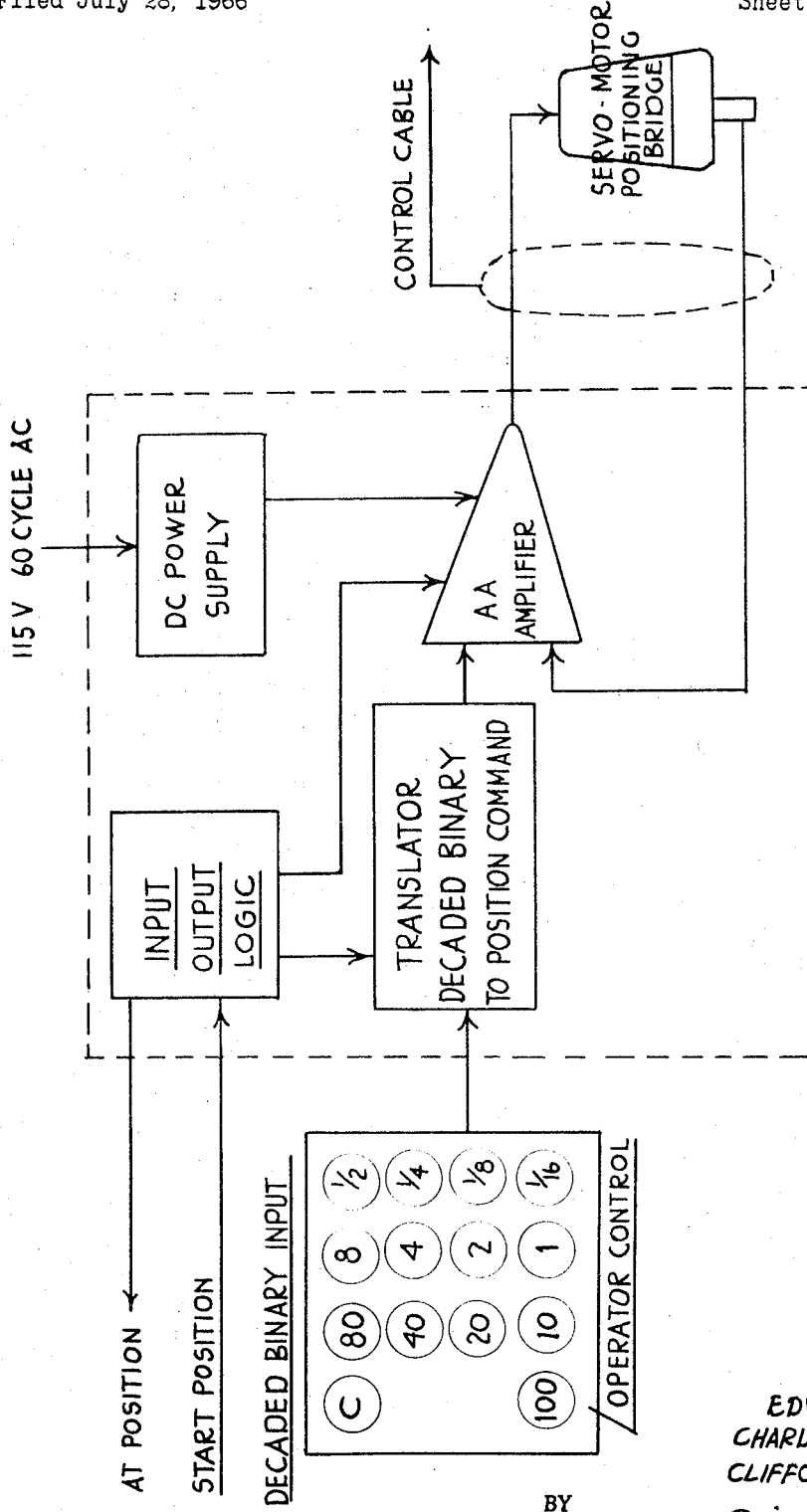

The apparatus has five major parts: an air conveying and support table; a positioning bridge spanning the support table; a fixed scoring bridge with movable scoring devices spanning the positioning table downstream of the glass travel; a severing section; and a run-out section. An understanding of the operation of the apparatus and the method used in this invention may be gained from the specification read in conjunction with the drawings wherein:

FIG. 1 is a schematized detailed showing of the air support table and positioning bridge;
FIG. 2 is a side view of the apparatus;
FIG. 3 is an end view of the air support table and positioning bridge;
FIG. 4 is a section view of the scoring bridge;
FIG. 5 is a schematic diagram of the electrical circuit of the positioning bridge;
FIG. 6 is a schematic diagram of the control circuit.

Squaring and conveying air support table

The air support table 11 is constructed as a plenum chamber. The top surface is provided with small diameter air holes 12, usually 1/16″, spaced about the major surface. A typical air table is approximately 15 feet 3 inches wide, and 16 feet long, having retractable conveyor rolls 13 extending 1/8 inch above the table, and having 6″ collars 22″ apart.

The rolls are driven at a speed of approximately 20 inches per second. The air table surface is sloped from the horizontal at an angle of about ½ of 1 degree. The rolls are retractable beneath the level of the support table, permitting a free-floating action for the glass sheet. In operation, air is provided at about 3.5 pounds per square inch (p.s.i.) or just sufficient to support a large sheet of glass. No exhaust means is provided, as the exhaust air escapes across the top of the major surface and beneath the supported glass.

A glass sheet is transported from the run-in conveyor onto the air table 14. When the glass is driven onto the air table, the conveyor rolls 13 are extended above the surface of the table. As the trailing edge of the plate goes onto the air table, the conveyor rolling motion is stopped and the rolls retracted into the table surface.

The sloping level of the air table causes the free-floating glass to drift to the lower side and contact a series of squaring rolls or wheels 15 at the lower edge of the table. The plate may also be driven into the squaring index by the rolls 20 or allowed to drift against the squaring index, which has moved into an extended position along the air table. The air-supported, free-floating glass sheet is positioned on top of the air support table, relative to the scoring bridge.

Positioning bridge

A positioning bridge 16, traveling on a pair of guide rails 18 parallel to the air support table, extends beyond the ends of the table. The bridge is positioned transversely over the air table and is designed too be traveled over the surface of the air-supported glass. A precise rack and pinion gear arrangement, FIG. 2, which is powered by a motor 51 is used to drive the bridge over the table and relative to the glass sheet; the bridge is precisely perpendicular to the parallel tracks 18 at all times.

A glass sheet to be severed is run onto the air support table, beneath and then beyond the bridge. The positioning bridge moves forward. A sensing device, i.e., a photocell 40, detects the trailing edge of the glass sheet. The photocell circuit is mounted on the downstream edge of the positioning bridge 16. The photocell is designed to respond to the passage of the trailing edge of the glass sheet beneath the bridge. A special color background may be provided on the surface of the air table and beneath the glass, so that the difference in reflective index may be utilized to actuate the photocell circuit. As the glass passes beneath the photocell and in response thereto, the motor 33 is actuated and the positioning bridge is moved downstream over the glass sheet.

A plurality of vacuum cups 17 lower and take hold of the plate. A dove-tail sensing device and circuit prevents contact between the cup and any scoring device. The squaring device 15 retracts and the glass plate is then positioned by the vacuum cups mounted on the positioning bridge, and supported by air pressure on the air support table. The positioning bridge continues to move downstream to any desired position. This desired position is determined by the length of the glass trim, if any, to be removed from the leading edge of the glass. The leading edge of the glass passes over sensing device 19 embedded in the upper surface of the air support table, which actuates an electronic measuring circuit. An electrical control circuit known as the feeler or fixed distance controls the length of travel of the bridge, as shown in schematic block diagram FIG. 5. This control circuit is set by an operator or other means. When the length of glass of any first cut, as determined, has passed beneath the bridge, the positioning bridge stops, placing the glass beneath the scoring device in the selected spot location. This completes the operation. A description of the "feeler circuit" on fixed distance circuit control is given below.

Feeler circuit

A detection device 19 is positioned in the air support bed. The leading edge of the glass sheet passes over the device and activates it, the precise distance between the leading edge of the glass and the center line of the subsequently-placed cutting roll or bar is automatically established. The positioning bridge is moved downstream this distance and the first cross score is made. When the detection device is activated, the bridge is slowed and stopped at a distance of 8 inches from and downstream of the device. The detection cross or transverse scoring device is activated and scores the glass transversely across the direction of glass travel. This circuit is shown in FIG. 5.

The longitudinal or slit scoring heads now move into the positions transverse across the machine as selected by the operator. As the cross-scoring head returns to its home position, the slit scoring heads move into position and then lower (using the two-pressure system, described herein) onto the surface of the glass. The positioning bridge, driven by the servomotor 33, then moves downstream and stops at the next previously-selected position as determined by the sequented control. The glass is carried beneath the scoring devices and is scored longitudinally by the movement of the glass relative to the scorers. The slit or longitudinal scorers raise and are retracted. Again the cross-scoring device is lowered against the plate and scores the plate transversely. This cycle is repeated for any desired number of cuts. Below is described the dove-tail scoring sensors, which prevent any collision between the advancing vacuum cups of the bridge and the scoring heads of the scoring bridge.

Dove-tail cutting sensors

As the longitudinal quills or scorers 28 progress along the surface of the glass and approach the vacuum cups, there is a possibility of a collision between quill and cup 17. A series of sensing bars, attached to the longitudinal scoring quills, are actuated by imminent contact with a vacuum cup. As a quill and a cup are meeting, the vacuum cup is disengaged from the glass and raised upwardly to clear the quill. Two cups over the number of quills provide positive positioning even if all vacuum cups be in a raised position as a result of imminent collision with quills.

Stationary bridge

The stationary bridge 25, shown in FIGS. 3 and 4, consists of a single hollow square tube 26 upon which are accurately mounted precision tracks that carry the cutting head. The cutting bridge has mounted thereon one cross-scoring tool 27 mounted on vertical track 30, and a plurality of longitudinal or slit-scoring tools 28 mounted on a horizontal track 29, mounted on the scoring bridge. The cross-cutting track is mounted vertically of the bridge. The tracks are mounted on the bridge to a tolerance of .003″ in their straightness. The horizontally-mounted track carries one trim cutter and three servo-positioned longitudinal cutting heads 28. The trim cutter is a side trim or stationary cutter 31. The servo-positioned slit cutters 28 travel at the rate of approximately 7.5 inches per second when being positioned. The horizontal track 29 is fabricated to the same tolerance as the vertically-mounted track and mounted to the bridge with equal precision. Directly above the track, is mounted a ⅕ circular pitch rack 32 in 18″ pieces. The tooth-to-tooth tolerances of the rack are approximately ±.001″, with an overall tolerance ±0.001″ installed.

The driving unit of the slit scorer engages the circular pitch rack using a 25 tooth driving gear. The three slitting heads can travel the length of the bridge on their common track. The slitting heads can approach within 7 inches of each other. Limit switches prevent running together of the heads.

The longitudinal scoring heads 28 are equipped with an air cylinder that retracts the cutter whenever the cross cutter is in operation. The scoring is performed either on top of a solid urethane-covered roll, or a hydraulically-actuated flat surface cutting bar. The cutting heads are air-actuated with the cutting pressures regulated from an air control box.

Provisions are made for feeding oil through the cutter to the glass surface using a metering-type solenoid operated valve, mounted on the cutting unit. The oil is fed through the wheel posts.

The longitudinal cutting heads are of a two-pressure type. Initial contact is made using a pressure which is just sufficient to overcome an upward pressure exerted by a compression spring. However, when the scoring head contacts the surface of the glass, an increased pressure is applied to the head, while the scoring operation is being performed. Several advantages accrue from this arrangement. First, the impact is reduced to a minimum level, thus preventing cracking of the glass. Second, the light pressure permits more accurate control of the scoring head while it is moving into contact with the glass. This eliminates a serious rebound problem by the scoring head. Any bouncing of the head will produce a longitudinal cutting line having defects. As indicated above, before the cross cutter is operated, a scoring roll or a support bar is raised into position beneath the point to be scored, to provide a support for the cross scorer.

The combined slit scoring and cross scoring with the servo-positioned cutting heads mounted on the same bridge has been completely successful. Longitudinal scores have not opened while being scored, nor while the transverse cut is being run with the snapping arms or breaking rolls. The cut plates are square and true within an accuracy of ±.015″ in both directions. One and one-half inch front and tail cross cut trims are easily run with the apparatus.

The system is operated at a capacity of 40–60 plates of 135″ by 180″ glass per hour, depending somewhat upon the number of cuts made on each plate, with the ability to selectively cut in increments of 1/16″ with an accuracy of ±.015″. The ability to cut plates to this dimension and vary the width of the plates has greatly increased the speed of the production and decreased the corresponding costs.

The associated hydraulic controls, vacuum supply lines, and electrical lines are provided by a series of flexible connections 38 between the control station and the machine.

Using this apparatus, it is now possible to cut accurately-sized glass sheets, both transversely and longitudinally of the sheet. The air table provides a frictionless support for the sheet as it is conveyed by the positioning bridge and a means to index the sheet relative to the bridge.

The fixed cutter bridge and the movable positioning bridge permit accurate scoring and breaking of the sheet into sizes. The transversely movable slit scorers provide a unique method of rapidly changing the width of the sheets to be slit scored and hence provide a flexible and economical method of cutting large glass plates into smaller sizes.

Run-out conveyor

A series of free-wheeling rolls 37 are arranged downstream from the air support table. Several power driven rolls are placed within the free-wheeling rolls. The presence of the power driven rolls provides a positive downstream traction for the continued movement of the glass. The rolls immediately downstream of the scoring bridge are made of a special urethane covering to prevent marking of the glass. The powered run-out rolls act to separate the severed sheets when they have been scored and snapped. Any standard take-off device may be employed at the end of the run-out section for removing the glass.

Operation

The operation of the cutting machine is as follows:

A glass sheet is driven onto the air table with the conveyor rolls up and the air supply on. When the trailing edge of the plate is on the air table, the conveyor rolls are stopped and dropped below the surface of the air table, allowing the plate to float to the lower side and against a squaring device which moved into an extended position. Or, at this point, positive traction may be applied from rolls 20 beneath the table which drive in a direction against the squaring device. The positioning bridge is actuated and moves downstream. A sensing device detects the trailing edge of the glass sheet and stops the bridge when the vacuum cubs are over the edge of the sheet. The vacuum cups lower and take hold of the plate. The squaring device retracts and the positioning bridge moves downstream. The leading edge of the glass is again sensed and the measuring device is actuated to measure the length of the trim cut or the length of the first cut, as desired.

The bridge stops at the selected position. The cross scorers are lowered to the surface of the glass, transversely score the plate, are raised, and then return transversely across the plate to their home position.

During the scoring operation, a suitable scoring roll or scoring bar is raised into position beneath the scoring tool to provide support for this portion of the glass while the scoring tool is running transversely of the plate. A breaking roll is positioned beneath the transverse scoring roll. When the scoring tool is returning to its home position the breaking roll is actuated. The snap roll is controlled by the sequence control panel.

Operation of the electrical control system

The positioning bridge drive consists of a servo drive motor 33: a servo drive power source, and associated control; a position feedback transducer 39; other auxiliary equipment; and a logic circuit for transmitting the instructions from the operator to the motive power for the positioning bridge. The servo motor drives the positioning bridge within an accuracy of $\pm \frac{1}{64}$ of an inch to the programmed position for all variations of load due to change in glass size. The drive incorporates controlled deceleration and sufficient stability to position the bridge to the required accuracy without any readjustments to compensate for variation in glass size.

A total accumulated error for multiple cuts on any large plate does not equal more than $\frac{1}{64}''$ times the number of cuts. The positioning bridge may be positioned over a range of $199\frac{31}{32}$ inches in increments of $\frac{1}{32}$ of an inch. The positioning servo drive is reversible and capable of driving the positioning bridge to a maximum speed of at least 900 inches per minute and has sufficient power and response to accelerate and decelerate the bridge, plus its load, to or from its full speed in about .5 second.

In operation the glass is run into the machine and stopped with the trailing edge of the plate just ahead of the positioning bridge. At this time, the glass is then squared. When the squaring is complete, an electronic signal is transmitted to the positioner drive to advance the bridge at low speed until the vacuum attachments 17 are over the trailing edge of the sheet, at which position the bridge will be stopped by a detection switch 40 mounted on the bridge and activated by the trailing end of the glass. The vacuum cups 17 are lowered; the vacuum is applied and the glass is firmly held to the bridge by the vacuum. Upon a command signal given to the positioner drive the bridge advances the glass at high speed. A signal circuit gives a signal to the positioner to command it to travel the distance beneath the fixed bridge required for the length of first cut. When the leading edge of the glass is a small known distance from the cutting position, it will operate a suitable detection device 19 which will then reference the measuring control equipment to the leading edge of the glass. It will then place the bridge drive means under the control of the numerical input equipment (FIG. 6). The bridge continues to advance until the glass approaches the first cut position; the bridge will decelerate and stop for the cut.

The sequence control will move the position bridge to the next stop and initiate the transverse cut, and then the snap functions. When the glass separation is complete, the control will signal the positioning controls to advance the glass to the position set up by the control bank, as determined by the desired length of the cut and will then cause the scoring and snapping unit to operate as described above. This sequence will continue until all of the desired cuts are made. The rear trim cut will be that portion of the glass remaining after all cuts are made.

When the last cut is made the sequence control will signal the positioner drive to advance to the forward position where it will be slowed down and stopped to carry the tail trim piece off the cutting table. When the drive stops the positioning bridge the vacuum will be released and a new sheet of glass will then be run onto the air table. As the vacuum cups are released, the sequence control will signal the positioning bridge to return the bridge to its home position where it will be stopped by suitable limiting devices. The cycle can then be repeated for the next plate of glass.

Servo drive

The positioning servo drive comprises motor 33 and precise rack and pinion gear 53, and is capable of driving the positioning bridge to a maximum speed of about 15 inches per second, or 900 inches per minute. The dynamic response of the bridge and servo system has a sufficient gain and other compensating networks in the drive to enable the positioner bridge to be positioned to an accuracy of $\pm \frac{1}{64}$ inch.

One suitable positioning servo drive is an adjustable voltage constant torque, direct current motor drive 33 energized from either a contactorless electronic reversing unit or an amplidyne or similar rotating amplifier. A rotary hydraulic motor supplied from the electro-hydraulic servo valve may also be used. The present embodiment prefers the electric drive, because it has required characteristics and also eliminates the possibility of hydraulic leakage and oil drippage on the glass.

Logic control

The logic system incorporates all equipment necessary to generate a suitable control signal for the servo drive system from the operator's keyboard input feedback signal for desired glass length as shown in FIGS. 5 and 6. The glass is cut incrementally, that is, each cut is programmed a given distance from the previous cut. The distance from the leading edge of the glass which is the reference to the trim cut is the distance set on a trim cut control keyboard. The distance from the reference point to the second cut is the sum of the settings for the trim and the first cut side. The distance from the reference point to the third cut is the sum of the settings for the trim, first and second cut size, etc., for the total number of cuts. Thus, any one cut command of the active keyboard control will be added to the previous command on the keyboard for the previous cut to obtain a new command representing the distance from the leading edge of the glass to the desired cut.

The logic system will be referenced in its memory to the leading edge of the glass from an appropriate detection device 19 near the stationary cutter bridge, thus a switch will be operated by the leading edge of the glass when it is a determined distance from the preferred cutting line. The position for the first cut will consist of the edge trim dimensions as set up on the edge trim keyboard, plus the distance from the detection device 19 to the cutting line of the bridge. In the preferred embodiment, this distance is approximately 8 inches. The position command for all cuts can then be set up on a keyboard.

An error detection circuit compares the command and feedback signals to generate a signal suitable for controlling the drive mechanism. It incorporates electrical means to adjust the approach slow-down point, slow-down rate and final approach speed. The logic system is interlocked to the sequence control when the positioning bridge is correctly positioned for a cut.

Programming push button control or keyboard

An appropriate input to the positioning system consists of a combined binary and binary-coded decimal input. The fractional inch input will be binary and consist of a half, a quarter, an eighth, a sixteenth and a thirty-second inch signal. The inch input is a binary-coded decimal signal. The first decade will be 1, 2, 4 and 8 inches; the second decade will be 10, 20, 40 and 80 inches; the third decade consists only of a 100 inch signal. The signals will be derived from sets of push buttons stationed in an operator control area. A proper set of buttons will be chosen by the program sequencing control so that only the desired position command will be presented to the positioning bridge. The program will change when the bridge is in position and will be held until the bridge is repositioned for the next cut. The positioning drive will not start until a start positioning impulse is received from the sequencing control.

Feedback transducer

The feedback unit will be mounted on the movable positioner bridge and it is driven from an instrument rack mounted along the machine ways. A suitable feedback transducer may be of a type capable of operating at 900 inches per minute, compatible with the previously described logic system, and having the required accuracy. The feedback transducer may be a syncro resolver, a shaft position coder, a directional pulse counter, or lineal tranducer.

The principal of preferred construction and operation of the invention has been explained and is considered to represent a desirable embodiment. It should be understood with within the scope of the appended claims, the invention may be practiced otherwise than as specifically illustrated and described.

We claim:

1. In a conveying and severing device for severing glass sheets, the combination comprising:
   (a) means for providing a cushion of air for partially supporting said glass sheet;
   (b) means for squaring said sheet relative to said air cushion means;
   (c) means for positioning a sheet of glass while on this air support, said means mounted transversely of the air support means and movable relative to said table;
   (d) means mounted transversely of said air support table, and downstream of said positioning means for providing support for scoring devices;
   (e) a plurality of scoring devices movably mounted on said scoring support means at least one of said devices movable transversely of the glass sheet for transversely severing said glass sheet;
   (f) a plurality of other scoring means mounted on said scoring support means and movable transversely of said air support table and movable relative to one another for longitudinally severing a glass sheet;
   (g) means for moving said scoring means;
   (h) detection means mounted on said positioning bridge responsive to a trailing edge of said air supported glass sheet for controlling the movement of said positioning bridge;
   (i) detection means for detecting the leading edge of a glass sheet positioned on said air support;
   (j) position feedback means responsive to said detecting means for stopping the downstream movement of said positioning bridge;
   (k) detection means responsive to said leading edge detection means and electrically connected to said transverse scoring means for actuating said transverse scoring means;
   (l) means for moving the transverse scoring means;
   (m) means for actuating said longitudinal scoring means for providing movement of said means transversely of said air support table;
   (n) electrical means connected to said score actuating means for positioning said longitudinal scoring means transversely relative to said air table;
   (o) severing means mounted downstream of said air support table; and
   (p) detection means responsive to the downstream movement of said glass for actuating said severing means in response to the downstream movement of a scored glass sheet to sever said scored sheets.

2. In a conveying and severing device for a glass sheet, the combination comprising:
   (a) an air table to partially support a glass sheet, said table having a substantially horizontal top surface with a slight transverse inclination to provide a lower longitudinal side;
   (b) means to supply air through openings to provide a film of air between said table top and said glass sheet positioned thereon so that said glass is at least partially supported by said film of air;
   (c) an abutment means positioned along the lower longitudinal table side said glass sheet floating freely to move by gravity on said film of air so that an edge of said glass sheet moves into abutting relation with said abutment means, said abutment means arranged to move transversely from said table lower longitudinal portion a pre-selected distance to thereby square said glass sheet on said table relative to said table;
   (d) a positioning device transversely spanning said table for movement relative to said table;
   (e) a plurality of vacuum devices carried by said positioning device and movable vertically toward and away from the top surface of said glass sheet;
   (f) sensing means carried by said positioning device, and arranged to sense the trailing edge of said glass sheet on said table and stop the downstream movement of said glass sheet over said table;
   (g) said positioning device arranged to convey said squared glass sheet longitudinally on said table while said glass sheet is supported on said film of air;
   (h) a fixed cutter bridge arranged transversely of said air table adjacent one edge, said cutter bridge operable to span a glass sheet positioned thereunder;
   (i) a plurality of scoring devices to score said glass sheet movably mounted on said cutter bridge, some of said scoring devices arranged to be movable transversely of said sheet and engageable to a major surface of said sheet;
   (j) means for moving said positioning bridge and attached glass sheet beneath said scoring bridge, so as to score said sheet longitudinally, and
   (k) means for transversely scoring said sheet beneath said scoring bridge when the downstream movement of said sheet is stopped.

3. In a method of cutting and severing glass sheets, the steps comprising:
   (a) floating a plate of glass having a leading and a trailing edge onto a cushion of air provided by an air support table;
   (b) positioning said plate relative to said table;
   (c) moving a positioning bridge astraddle a trailing edge of said plate;
   (d) attaching said positioning bridge to said plate by vacuum means applied to a major surface of said plate;
   (e) moving said bridge downstream with the attached plate;
   (f) sensing the leading edge of said plate;
   (g) then moving the bridge downstream a selected distance;
   (h) stopping the movement of said bridge in response to the leading edge of said plate;
   (i) actuating a cross-scoring device in response to said sensing device to transversely score the glass;
   (j) retracting said transverse scoring device;

(k) actuating a plurality of longitudinal scorers to contact a major surface of said plate;
(l) moving said plate beneath said longitudinal scorers to produce longitudinal scores in a surface therein;
(m) detaching said positioning bridge and vacuum means from said plate;
(n) actuating a cross scoring means;
(o) moving said scored plate downstream from said table;
(p) severing said plate along said score lines to form plates of pre-selected sizes.

4. In a method of cutting and severing glass sheets, the steps comprising:
 (a) floating a plate of glass having a leading and a trailing edge onto a cushion of air provided by an air support table;
 (b) positioning said plate relative to said table;
 (c) moving a positioning bridge astraddle a trailing edge of said plate;
 (d) attaching said positioning bridge to said plate by vacuum cup means applied to a major surface of said plate;
 (e) moving said bridge downstream with the attached plate so as to move the glass sheet beneath the fixed bridge a predetermined distance, and;
 (f) then stopping said bridge;
 (g) actuating a cross-scoring device to transversely score the glass sheet;
 (h) retracting said transverse scoring device;
 (i) contacting a plurality of longitudinal scorers to a major surface of said plate;
 (j) moving said plate beneath said longitudinal scorers to produce scores in a surface therein;
 (k) detaching said positioning bridge from said plate;
 (l) actuating the cross scoring means to sever said plate transversely;
 (m) moving said scored plate downstream from said table, then;
 (n) severing said plate along said score lines to form plates of pre-selected sizes.

5. In a conveying and severing device for severing glass sheets, the combination comprising:
 (a) means for providing a cushion of air for partially supporting said glass sheet;
 (b) means mounted transversely of said air support table for providing support for scoring devices;
 (c) a plurality of scoring devices movably mounted on said scoring support means at least one of said devices movable transversely of the glass sheet for transversely severing said glass sheet;
 (d) a plurality of other scoring means mounted on said scoring support means and movable transversely of said air support table and movable relative to one another for longitudinally severing a glass sheet;
 (e) means for moving said scoring means;
 (f) means for detecting the leading edge of a glass sheet positioned on said air support;
 (g) detection means responsive to said detecting means for actuating a longitudinal scoring means;
 (h) means for actuating said longitudinal scoring means for providing movement of said means transversely of said air support table;
 (i) electrical means connected to said score actuating means for positioning said longitudinal scoring means transversely relative to said air table;
 (j) severing means mounted downstream of said air support table.

6. In a method of cutting and severing glass sheets, the steps comprising:
 (a) floating a plate of glass having a leading and a trailing edge onto a cushion of air provided by an air support table;
 (b) actuating a plurality of longitudinal scorers to contact a major surface of said plate;
 (c) moving said plate beneath said longitudinal scorers to produce longitudinal scores in a surface therein;
 (d) actuating a cross scoring means;
 (e) moving said scored plate downstream from said table;
 (f) severing said plate along said score lines to form plates of pre-selected sizes.

7. In a conveying and severing device for severing a glass sheet, the combination comprising:
 (a) an air table to partially support a glass sheet, said table having a substantially horizontal top surface with a slight transverse inclination to provide a lower longitudinal side;
 (b) means to supply air through openings to provide a film of air between said table top and said glass sheet positioned thereon so that said glass sheet is at least partially supported by said film of air;
 (c) an abutment means positioned along one side of the air table;
 (d) means for moving said glass sheet against said abutment means;
 (e) a positioning device transversely spanning said table for movement relative to said table;
 (f) a plurality of vacuum devices carried by said positioning device and movable vertically toward and away from the top surface of said glass sheet;
 (g) sensing means carried by said positioning device and arranged to sense the trailing edge of said glass sheet on said table and stop the downstream movement of said glass sheet over said table;
 (h) said positioning device arranged to convey said squared glass sheet longitudinally on said table while said glass sheet is supported on said film of air;
 (i) a fixed cutter bridge arranged transversely of said table adjacent one edge, said cutter bridge operable to span a glass sheet positioned thereunder;
 (j) a plurality of scoring devices to score said glass sheet movably mounted on said cutter bridge, some of said scoring devices arranged to be movable transversely of said sheet and engageable to a major surface of said sheet;
 (k) means for moving said positioning bridge and attached glass sheet beneath said scoring bridge, so as to score said sheet longitudinally, and
 (l) means for transversely scoring said sheet beneath said scoring bridge when the downstream movement of said sheet is stopped.

References Cited

UNITED STATES PATENTS

| | | | |
|---|---|---|---|
| 3,198,044 | 8/1965 | Clin | 83—10 |
| 3,253,756 | 5/1966 | Haley | 83—402 X |

FOREIGN PATENTS

| | | |
|---|---|---|
| 606,481 | 8/1948 | Great Britain. |

JAMES M. MEISTER, *Primary Examiner.*

U.S. Cl. X.R.

33—32; 83—11, 402; 225—96.5